Jan. 26, 1960

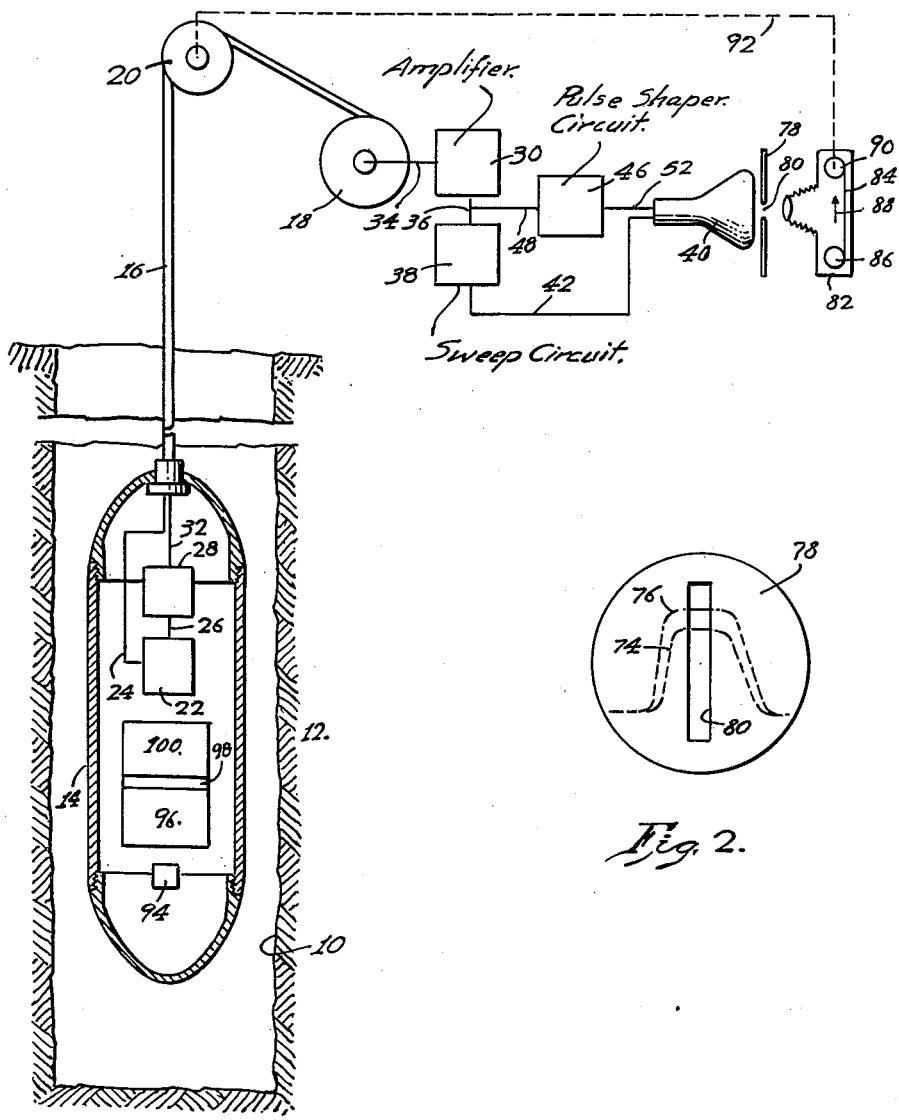

C. W. TITTLE 2,922,885

LOGGING OF ENERGY DISTRIBUTION

Filed Dec. 29, 1953

INVENTOR.
Charles W. Tittle.
BY
Hiram A. Cook
ATTORNEY.

United States Patent Office 2,922,885
Patented Jan. 26, 1960

2,922,885

LOGGING OF ENERGY DISTRIBUTION

Charles W. Tittle, Oakmont, Pa., assignor to Gulf Research & Development Company, Pittsburgh, Pa., a corporation of Delaware Application December 29, 1953, Serial No. 400,956

9 Claims. (Cl. 250—71)

This invention relates to logging, and more particularly pertains to a method of and apparatus for logging the energy distribution of radiations from various portions of a mass of material with respect to the positions of such various portions of the material.

Broadly, the present invention comprises detecting radiations as they enter a zone that is movable relative to the mass of material to be logged; producing an electrical pulse for each detected event having a voltage height dependent upon the energy of the detected radiation; producing a trace on an oscilloscope for each electrical pulse with such trace having a substantially straight horizontal portion that is vertically displaced to an extent dependent upon the height of the pulse; and moving photographic film horizontally in front of the oscilloscope at a rate proportional to the relative velocity of the zone, while masking the nonlinear portions of the traces.

The relative velocity of the zone and the proportional rate of film movement are such that an exposure band or exposure bands are produced in each increment of the film that are analogous to the bands obtained in optical spectography. The film, after processing, affords a photographic record of the energy spectrum of the detected radiations with each increment of the film being correlative to the position of the part of the material logged from which the radiations emanated.

The term "radiation" is used throughout this specification and the accompanying claims to include electromagnetic radiations, such as X-rays and gamma-rays, and elementary particles, such as neutrons. In general, and for reasons that will subsequently become apparent, the term "radiation" is meant to include such radiation as can, by conventional apparatus and methods be detected in such a manner as to produce electrical energy pulses having heights dependent upon the energy of the detected radiation, at least for a substantial range of energies.

For example, proportional counters can be employed for detecting charged elementary particles in such a fashion. With slight modification, that is by the incorporation of hydrogen or deuterium gases, proportional counters can be used in such a manner for detecting a wide energy range of fast neutrons on the basis of the energy of the recoil proton. On the other hand, a combination of suitable scintillation phosphors and photomultiplier tubes can be used in a corresponding fashion with respect to gamma-rays.

While the invention encompasses detecting a variety of types of radiations, the same is especially well adapted and the results are particularly gratifying in the detection of gamma-rays where the scintillation phosphor is used. This is at least in part due to the excellent sensitivity and relatively high resolution that may be so obtained between gamma-rays of close energy levels.

The radiations detected may be natural, or artificially brought about as by subjecting the material being logged to radiations of similar or different character to those being detected.

The invention is suited for employment in many different environments, as will be appreciated by those skilled in the art. However, since it is believed that the same is particularly valuable for use in well logging, and since such employment will adequately portray the principles of the same; the invention is shown and described in conjunction with such use.

In the drawings:

Fig. 1 is a diagrammatic representation of the invention showing the same in conjunction with a well-logging probe;

Fig. 2 is a front elevation of the oscilloscope and the mask therefor; two representative traces being shown with the mask-hidden portions thereof being shown in dashed outline;

Figure 3:
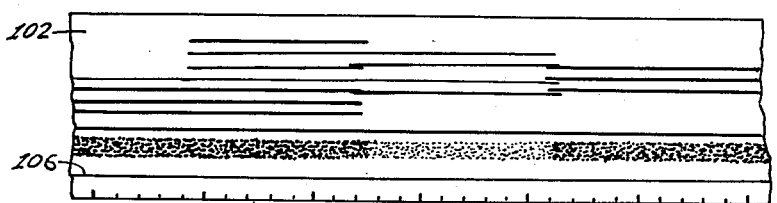
Fig. 3 is an idealized view of a section of film record obtained.

Referring to the drawings, the numeral 10 designates a borehole in earth formations 12 through which a probe housing 14 is adapted to be moved vertically.

The probe housing 14 is supported for vertical movement by a multiple-electric-conduit cable 16 that extends from a reel 18 over a supporting pulley 20 to the probe housing 14.

Disposed within the probe housing 14 is a gamma-ray detector 22 of the type that will produce an electrical pulse for each detected gamma-ray having a pulse height distribution determined by the energy of the detected gamma-ray; preferably a combination of a scintillation phosphor, such as a crystal of thallium-activated calcium iodide or thallium-activated sodium iodide, and a photomultiplier tube. The detector 22 is suitably energized by an electrical circuit indicated diagrammatically at 24.

The electrical pulse output of the detector 22 is fed by electrical circuit 26 to an amplifier 28, and the amplified electrical pulse output of the amplifier 28 is fed to a further amplifier 30 above the earth's surface by means of an electrical circuit 32 that extends through the cable 16 and a pickup circuit 34 associated with the reel 18.

The output of the amplifier 30 is divided with a portion thereof being fed through an electric circuit 36 to the input of a conventional sweep circuit 38 of the type that produces a saw-tooth output voltage, which is triggered by the input electrical pulse. The output of the sweep circuit 38 is fed to the horizontal deflecting plates, not shown, of a conventional cathode-ray oscilloscope 40 by electrical circuit 42. The sweep circuit 38 can conveniently be such as that disclosed on page 318 of Electronics-Experimental Techniques, William C. Elmore and Matthew Sands, first edition, McGraw-Hill Book Company, Inc., New York, 1949.

The output of the amplifier 30 is also fed to the input 44 (see Fig. 4) of a pulse shaper circuit 46 by electrical circuit 48. The pulse shaper circuit 46 produces an output pulse having a height substantially proportional to the height of pulses fed into its input 44, but which output pulses are substantially flattened so as to have a substantially constant peak output voltage for a time interval of about the order of the sweep-time of the sweep circuit 38. The output 50 (see Fig. 4) of the pulse shaper circuit is connected to the vertical deflecting plates, not shown, of the oscilloscope 40 by an electric circuit 52.

Figure 4:
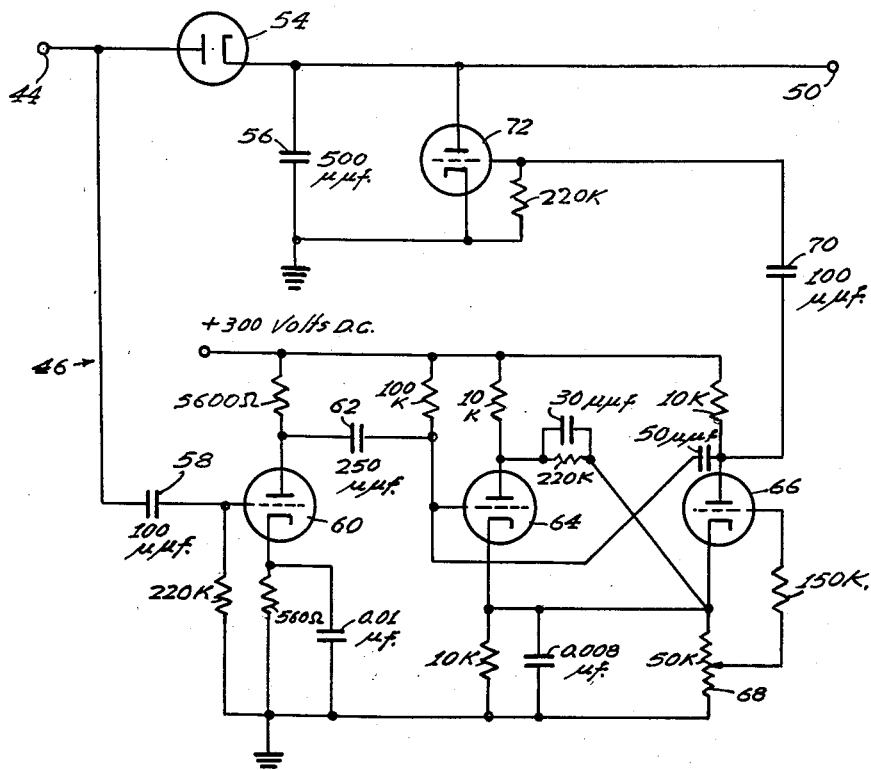
Fig. 4 is a schematic diagram of the pulse shaper circuit shown in Fig. 1.

A schematic diagram of a suitable form of the pulse shaper circuit 46 is shown in Fig. 4. Referring to Fig. 4, the pulses fed to the input 44 are positive, and each input pulse causes a charging diode 54 (½ of a 6AL5) to conduct, placing a certain charge on a storage capacitor 56 that is dependent upon the voltage of the positive pulse. When the input pulse voltage reaches a level below that to which the capacitor 56 is charged, the diode position to the solid line position of Fig. 6, with such increasing imposition of force on the button as to cause switch 20 to close, the pump motor operates impeller 49 and the liquid level falls accordingly, the chamber 63 being subject to the suction at the intake of the impeller. Prior to this, the chamber 63 of the control has been pressurized only upon a rise of the liquid level above the small port 68 in line 64.

As the liquid level falls a partial pressure or vacuum condition becomes effective in chamber 63, which is not materially affected by the small bleeder aperture 68, and this vacuum causes the diaphragm 14 to be held in closing relation to the switch 20. The vacuum is not reduced sufficiently to enable the diaphragm to move away from the switch button and permit the switch to open until the level has dropped beneath the intake, or impeller eye, end of the vacuum line 64. When this occurs, the vacuum in chamber 63 is immediately broken.

The provision of the auxiliary vacuum line 64 is thus seen to constitute a simple and convenient means to materially lengthen the operating cycle of the motor and thus practically dry out the sump before the motor cycle terminates. The optional positioning of the small aperture 68 permits a desired variation in the differential pressurizing of the diaphragm 14 on its opposite sides; and the inverse size proportioning of the larger chamber 63 and smaller vacuum line 64 in relation to the smaller pressure chamber 61 and the larger pressure line 58 affords a further means of timing the installation as to the institution and termination of motor operation.

In reference to Fig. 6, it may be noted that the diaphragm housing or casing 52 is here designed for disposition externally and to one side of a motor housing (not shown), and to this end, a spring clip 70 is affixed to the casing 52 and may snap onto the usual shaft housing 71. However, it will be clear from the foregoing, and it is an important feature of the invention, that the housing or casing 52 need not be mounted to either the pump or its motor, but can be disposed in any convenient location, so long as its pressure tube 58 (and vacuum tube 64 also, if employed) is brought properly into the sump. It follows as another advantage that no part of the housing need be immersed in the sump water.

The control illustrated in Fig. 6 may be, as indicated above, produced as a replacement or adapter unit, for which type of operation the unit has special utility due to certain wiring provisions hereinafter described. The invention as embodied in Fig. 6 also contemplates a modification of the intake tube 58 to the pressurized side of the diaphragm housing or casing 52.

In accordance with this improvement, the tube 58 is, upon installation and proper location relative to the sump, flattened substantially at 58' over a length which will be determined in accordance with the particular installation, the length occurring intermediate the overall length of the tube 58. The outline of the tube, minus the flattened section 58', is shown in dot-dash line in Fig. 6.

Thus, as the sump water level rises, water will rise in the full diameter lower section of the tube 58 and, entering the flattened section 58', its ability to compress air in the chamber 61, for a given increment of water level rise in the sump, is materially diminished. Thus, the interval before the diaphragm 14 operates to close switch 20 is increased, and the pump comes into operation at a later time. The duration of this interval may be controlled by lengthening or shortening the flattened section 58', or varying its flatness or its location.

The control regulation may also be accomplished by a rotative adjustment of the tubular externally threaded mounting fitting 26 of switch 20, which fitting threads directly in a boss 53' of switch housing member 53 and is held by a lock nut 53". By this means the switch button 22 may be positioned variably in relation to diaphragm, thus to regulate the commencement and duration of motor cycles, yet the axial alignment of the button and diaphragm remains unchanged.

In the unit illustrated in Fig. 6 the electrical leads 30 from the switch are brought out through the tubular threaded mounting fitting 26, preferably in the form of a conventional insulated cable 73 leading to a conventional electrical plug-in connector 74, and a type of female electrical socket member 75 is connected in the cable 73 with its socket terminals 76 wired in series with the plug 74 and switch terminals 31. Cable 73 may be of any desired length, so that in applying the control unit as a replacement, all that is necessary to do is to connect the existing electrical motor connector (not shown) of the sump pump in the socket 75, then plug the connector 74 in a suitable electrical outlet socket or box. It is not necessary to make any particular mounting for the control housing 52, and any support on which it may be suspended will suffice. Tubes 58 and 64, if used, are brought to the sump as above described.

Fig. 7 illustrates an alternative type of regulatory provision in the intake tube 58 as a means for determining the cut-in and cut-out time of the pump motor in any particular installation. In this instance, the tube 58 is shaped in a spiral coil 59 of flexible tubing intermediate the top and bottom extremities of the tube. The coil is adapted to be elongated by stretching the same to form the intermediate axially distorted coil portion 60, which in the length of a single coil convolution or two will occupy an axial length much greater than the undistorted coil. Accordingly, a given rise of water level in the sump will be more effective, entering the lower coils 59 and effecting a greater displacement of air for a given liquid rise, than in the uncoiled length. It is then possible, by altering the overall length of the coiled section upon installation, by stretching out the portion 60, to set the motor cut-in and cut-out times as desired. The adaptation of Fig. 7 represents a reversal of the effect of the regulatory means shown in Fig. 6.

Fig. 8 illustrates a further modification operating on the principle of Fig. 7 to accomplish the foregoing purpose. In this instance, an adapter casing or chamber 62 is inserted in the intake tube 58, as by connecting fittings 62' at the top and bottom of the casing. The enlarged volume of the latter occasions an increased compression of air in the pressure chamber 61, as water rises from the lower end of tube 58 into the adapter casing 62, with a corresponding adjustment of the motor cut-in and cut-out interval.

What I claim as my invention is:

1. A control unit for a sump pump or like motor, comprising a housing having a flexible diaphragm subdividing its interior into pressure and switch control chambers on opposite sides of the diaphragm, an elongated liquid intake tube downwardly communicating said pressure chamber with a source of liquid to be pumped, a vacuum line to communicate said control chamber with the intake side of the pump, a switch disposed in said control chamber for actuation by said diaphragm upon pressurization of said pressure chamber, said switch having an operating element facing said diaphragm and operated thereby under the effects of pressure and vacuum in said respective pressure and control chambers, said switch being provided with a threaded mount disposed in coaxial alignment with said operating element, said threaded mount having threaded engagement with said housing for rotative adjustment to variably position said operating element relative to said diaphragm.

2. A control unit for a sump pump or like motor, comprising a housing having a flexible diaphragm subdividing its interior into pressure and switch control chambers on opposite sides of the diaphragm, a liquid intake member downwardly communicating said pressure chamber with a source of liquid to be pumped, a vacuum line to communicate said control chamber with the intake side of the pump, a switch disposed in said manner are not suited for accurately determining the total number of detected radiations, or for that matter, the total number of detected radiations falling within a particular energy range; a conventional pulse counting circuit and recorder, not shown, can be additionally coupled to the output of the amplifier 30. A conventional kicksorter or discriminator, not shown, can be utilized in combination with such a pulse counting circuit and recorder so that only pulses of a predetermined range of pulse heights will be counted and recorded, whereby analytical interpretation of the photographic record on the film 84 can be facilitated.

From the foregoing, it will be evident that the broad principles of the invention encompass analogous energy spectrum logging of other types of radiation, where such other types of radiation can be detected to produce pulse heights that depend upon the energy of the detected radiation.

The invention has been described in considerable detail in order to convey a full and complete understanding thereof, and no undue implication of narrowness in scope is to be drawn therefrom; attention being directed to the appended claims for ascertaining the actual scope of the invention.

I claim:

1. Logging apparatus comprising movable radiation detecting means for producing an electrical pulse for each detected radiation of a height dependent upon the energy of such detected radiation, an oscilloscope having horizontal and vertical deflecting plates, a sweep circuit having a pulse-triggered time base electrically connected to the horizontal deflecting plates, said detecting means being electrically connected to said sweep circuit and also to said vertical deflecting plates, means for moving photographic film horizontally in front of the oscilloscope at a rate proportional to the rate of movement of said detecting means, and a mask disposed in front of the oscilloscope, said mask having a vertical slot therein and being adapted to be interposed between said oscilloscope and photographic film.

2. The combination of claim 1, including pulse shaping circuit means electrically interposed between the detecting means and the vertical deflecting plates for flattening oscilloscope traces for a distance corresponding substantially to at least about the width of the slot in said mask.

3. The combination of claim 2, wherein said detecting means includes a scintillation phosphor and a photomultiplier tube.

4. The combination of claim 3, wherein said scintillation phosphor is a thallium-activated calcium iodide crystal.

5. Logging apparatus comprising a movable probe, said probe including a source of radiations and radiation detecting means for producing an electrical pulse for each detected radiation of a height dependent upon the energy of such detected radiation, an oscilloscope having horizontal and vertical deflecting plates, a sweep circuit having a pulse-triggered time base electrically connected to the horizontal deflecting plates, said detecting means being electrically connected to said sweep circuit and also to said vertical deflecting plates, means for moving photographic film horizontally in front of the oscilloscope at a rate proportional to the rate of movement of said probe, and a mask disposed in front of the oscilloscope, said mask having a vertical slot therein and being adapted to be interposed between said oscilloscope and photographic film.

6. The combination of claim 5, wherein said source of radiations is a neutron source.

7. The combination of claim 6, wherein said detecting means includes a scintillation phosphor and a photomultiplier tube.

8. Logging apparatus comprising a movable probe, said probe including a source of radiations and gamma-ray detecting means incorporating a scintillation phosphor for producing an electrical pulse for each detected gamma-ray of a height dependent upon the energy of the gamma-ray, an oscilloscope having horizontal and vertical deflecting plates, a sweep circuit having a pulse-triggered time base electrically connected to the horizontal deflecting plates, said detecting means being electrically connected to said sweep circuit and also to said vertical deflecting plates, means for moving photographic film horizontally in front of the oscilloscope at a rate proportional to the rate of movement of said probe, and a mask disposed in front of the oscilloscope, said mask having a vertical slot therein and being adapted to be interposed between said oscilloscope and photographic film.

9. The combination of claim 8, including pulse shaping circuit means electrically interposed between the detecting means and the vertical deflecting plates for flattening oscilloscope traces for a distance corresponding substantially to at least about the width of the slot in said mask.

References Cited in the file of this patent

UNITED STATES PATENTS

| | | |
|---|---|---|
| 2,313,310 | Arnold | Mar. 9, 1943 |
| 2,362,164 | Silverman | Nov. 7, 1944 |
| 2,586,392 | Sheldon | Feb. 19, 1952 |
| 2,617,042 | Wouters | Nov. 4, 1952 |
| 2,648,012 | Scherbatskoy | Aug. 4, 1953 |
| 2,659,011 | Youmans et al. | Nov. 10, 1953 |
| 2,742,574 | Weisz | Apr. 17, 1956 |